United States Patent [19] [11] 4,148,277
Engle et al. [45] Apr. 10, 1979

[54] ANIMAL PEN CONSTRUCTION

[75] Inventors: William L. Engle; Charles E. Zuverink, both of Zeeland; Richard A. Vander Kolk, Port Sheldon; Thomas L. Brooks, Wyoming, all of Mich.; Cecil L. Weaver, North Manchester, Ind.

[73] Assignee: Cyclone International Incorporated, Holland, Mich.

[21] Appl. No.: 772,326

[22] Filed: Feb. 25, 1977

[51] Int. Cl.² .................. A01K 1/02; E04H 17/00
[52] U.S. Cl. .................................. 119/20; 256/21; 256/24
[58] Field of Search ............... 119/20, 16, 27; 256/21, 256/22, 25, 59, 65, 24

[56] References Cited

U.S. PATENT DOCUMENTS

| 917,083 | 4/1909 | Kyle | 256/65 |
|---|---|---|---|
| 1,024,858 | 4/1912 | Kissinger et al. | 256/59 |
| 2,714,367 | 8/1955 | Arnold | 119/27 |
| 2,729,196 | 1/1956 | Breitenbach | 119/20 |
| 2,733,897 | 2/1956 | Diamond | 256/65 X |
| 2,919,113 | 12/1959 | Cofield | 256/65 |
| 3,204,606 | 9/1965 | Parr et al. | 119/20 |
| 3,650,245 | 3/1972 | Karnes | 119/20 |
| 3,902,703 | 9/1975 | Bouye | 256/24 |

Primary Examiner—Hugh R. Chamblee
Attorney, Agent, or Firm—Blanchard, Flynn, Thiel, Boutell & Tanis

[57] ABSTRACT

An animal pen construction having sidewalls and a gate which are formed from a plurality of prefabricated modular rail sections. These rail sections have cooperating male and female portions on opposite ends to permit the sections to be slidably telescopically connected together. A single universal post member is utilized both in a straight run along the sidewall, and as a corner or gate post, for supporting the walls in an upright position. The posts permit from one to four connections thereto, which connections can run straight through the post or at right angles thereto. A latch structure cooperates between the gate and the associated post to permit horizontal swinging of the gate into an open position. This latch structure also functions as a hinge so that provision of this latch structure adjacent each edge of the gate enables the gate to be hingedly opened about either edge thereof.

13 Claims, 7 Drawing Figures

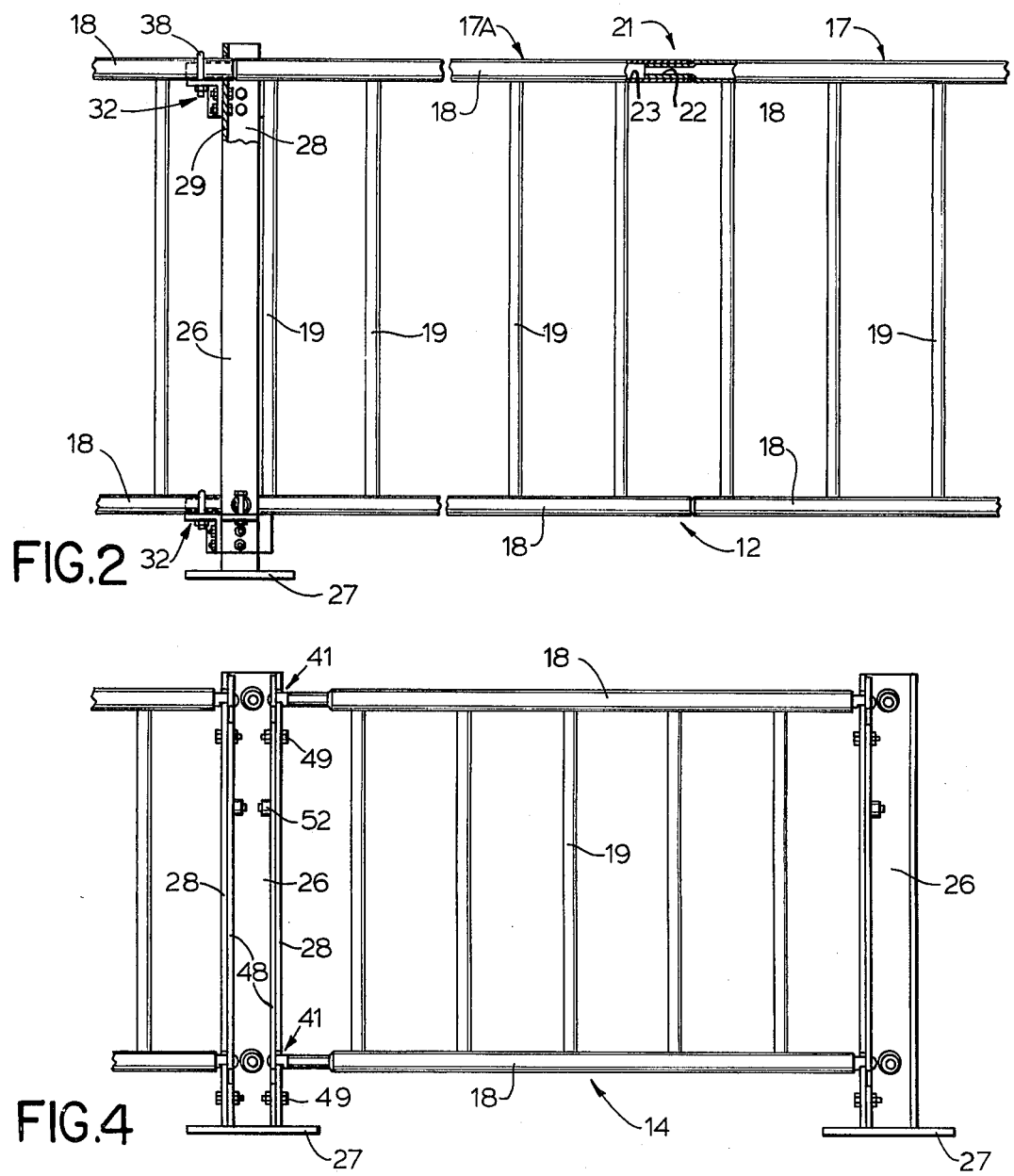

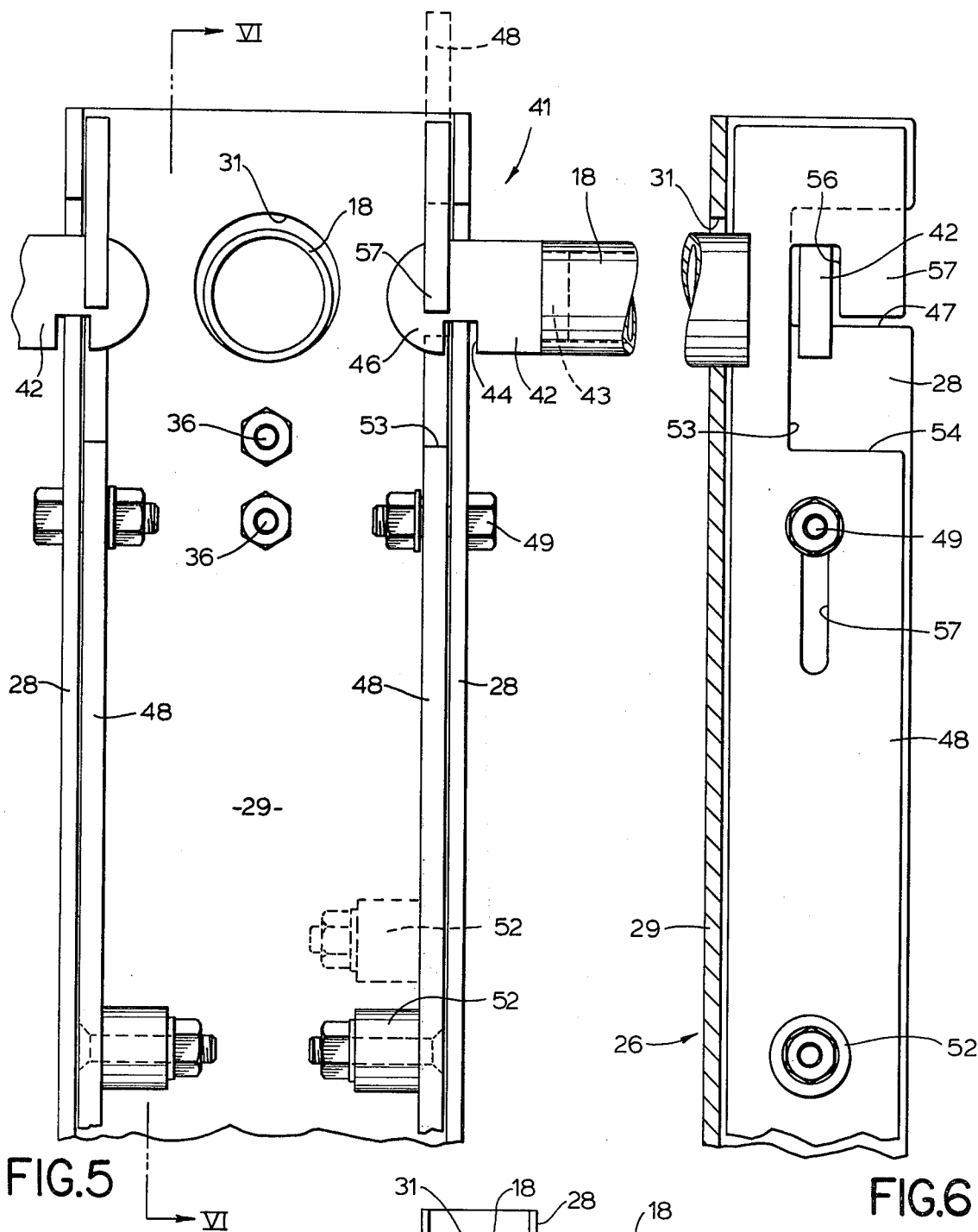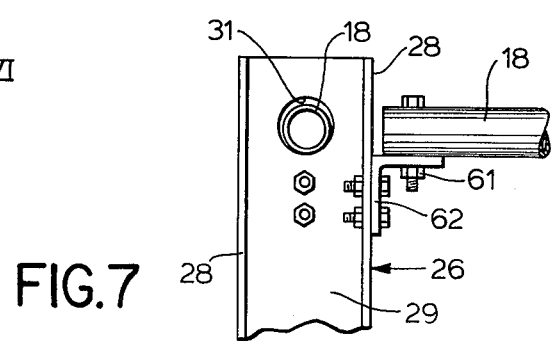

ANIMAL PEN CONSTRUCTION

FIELD OF THE INVENTION

This invention relates to an improved animal pen construction for confining livestock, particularly hogs.

BACKGROUND OF THE INVENTION

Livestock such as hogs are being extensively raised in structures which provide optimum conditions for the growth and health of the livestock. In order to provide proper control and yet segregation of the livestock within the structure, the interior of this structure is normally subdivided into numerous pens. These pens, however, have possessed several structural and operational disadvantages.

More specifically, the known animal pen constructions require a large number of different stock parts in order to build the various desired sizes and configurations of animal pens. For example, many manufacturers stock as many as 80 to 100 different components in order to build up the desired pen structures. The necessity of having to stock this large number of different components is extremely costly in terms of parts inventory, and also makes ordering of the pen structure more difficult.

A further disadvantage of the known pen constructions relates to the manner in which the gate is formed. Most pens utilize a one-piece gate and, since the gates vary in size over a substantial range, this thus requires that the manufacturer stock a large number of different gate sizes. In addition, the structure of the gate must necessarily be different from the structure of the pen sidewalls, which further increases the complexity of the overall pen construction and increases the number of different parts.

The known animal pen constructions are also complex due to the necessity of having to compensate for both manufacturing and assembly tolerances. Many animal pen constructions utilize intermediate posts which connect adjacent sections of the sidewalls. These posts are fixedly connected to the adjacent sidewall sections but, in view of manufacturing and assembly tolerances, the connection between the sidewall sections and the posts normally involves elongated slots so as to permit compensation for the tolerances. This type of structural connection can, however, result in undesired looseness in the overall assembly.

Still a further disadvantage of known animal pen constructions results from the difficulty in maintaining the gate securely latched. In some of the known pen constructions, the gate latch is positioned such that the hogs can cause it to release, either by hitting the latch or by lifting on the gate with their snout. While some known pen constructions have been provided with a hidden latch so as to prevent the hogs from jiggling and releasing the gate, nevertheless the latch structures of this type have been costly and complex, and have made operation of the gate more difficult.

Another disadvantage of some known animal pen constructions is the inability to provide the gate with a suitable hinge which permits the gate to be hingedly opened about either edge. In many usages, particularly when a plurality of pens are disposed in side-by-side relationship, it is desirable to open adjacent gates and move the animals from one pen to the next, sequentially down a row of pens, to permit cleaning of the pens. Thus, the gates must be openable about either edge. Many of the known constructions are unable to accomplish this dual opening function in a satisfactory manner, while at the same time resulting in a simple yet secure gate structure.

Accordingly, it is an object of the present invention to provide an improved prefabricated animal pen construction which overcomes the numerous disadvantages which have been elaborated above.

In the improved pen construction of this invention, the sidewalls and gate are of a modular construction which involves a plurality of modular rail sections which are formed in unit lengths, such as lengths of one, two and four feet. These rail sections have cooperating male and female portions on opposite ends to permit the sections to be easily telescopically connected together. In this manner, the sidewalls and gate can all be assembled in the desired length from a selected number of modular sections. In addition, the telescopic male-female connection between the adjacent modular sections automatically compensates for the manufacturing and assembly tolerances.

The present invention also uses a single universal post which can be utilized both in a straight run along the sidewall, and as a corner or gate post. This post permits either one, two, three or four connections thereto, which connections can run straight through the post or at right angles thereto. The post preferably has a large opening extending therethrough which permits the straight run of a sidewall to pass therethrough, with the two adjacent modular sections of the sidewall extending through the opening so that the post can take the load of the sidewall while enabling the telescopic connection between the adjacent sections to compensate for tolerances. While not necessary, the sidewall sections are preferably rigidly connected to the post, as by a muffler-type clamp.

In the animal pen construction of the present invention, there is provided an improved latch structure which cooperates between the gate and the associated post, which latch structure provides extreme strength and rigidity while positively locking the gate in a closed position so that same cannot be accidentally opened by the hogs. This latch structure also functions as a hinge in that it enables the gate to be hingedly opened about either edge, while at the same time the combined hinge-latch structure is structurally simple and involves a minimum number of components.

The pen construction of this invention also possesses substantially improved strength and rigidity, and at the same time permits compensation for the manufacturing and assembly tolerances due to the manner in which the modular wall sections slidably telescope together, and due also to the manner in which the sections cooperate with the posts.

This pen construction also has greater versatility in terms of its adaptability for use in forming pens having different sizes and/or configurations, and yet utilizes a small number of standardized components, such as approximately 12 to 18 different components. For example, the wall panels and gate can be formed from modular wall sections having selected unit lengths, such as lengths of one, two and four feet. In addition, there is provided a single universal post which is usable as a corner post, a gate post or a sidewall post. The latching structure involves a simple slidable latch member, and in addition several small connecting components such as bolts, clamps and the like are provided for joining the various elements together. The total number of components is hence greatly reduced, thereby simplifying the manufacture and assembly of the pen construction, and also minimizing the number of different parts which must be maintained in the manufacturer's inventory.

Other objects and advantages of the present invention will be apparent to persons familiar with structures of this type upon reading the following specification and inspecting the accompanying drawings.

BRIEF DESCRIPTION OF THE DRAWINGS

FIG. 2 is a fragmentary elevational view of the pen sidewall, as taken substantially along the line II—II in FIG. 1.

FIG. 3 is a fragmentary sectional view as taken substantially along the line III—III in FIG. 1.

FIG. 4 is a front elevational view of the gate, as taken substantially along the line IV—IV in FIG. 1.

FIG. 5 is an enlarged frontal view of the gate post and illustrating the cooperation of the latch structure.

FIG. 6 is a sectional view taken substantially along the line VI—VI in FIG. 5.

FIG. 7 illustrates a modified structure for hingedly connecting the gate to the post.

Figure 1:
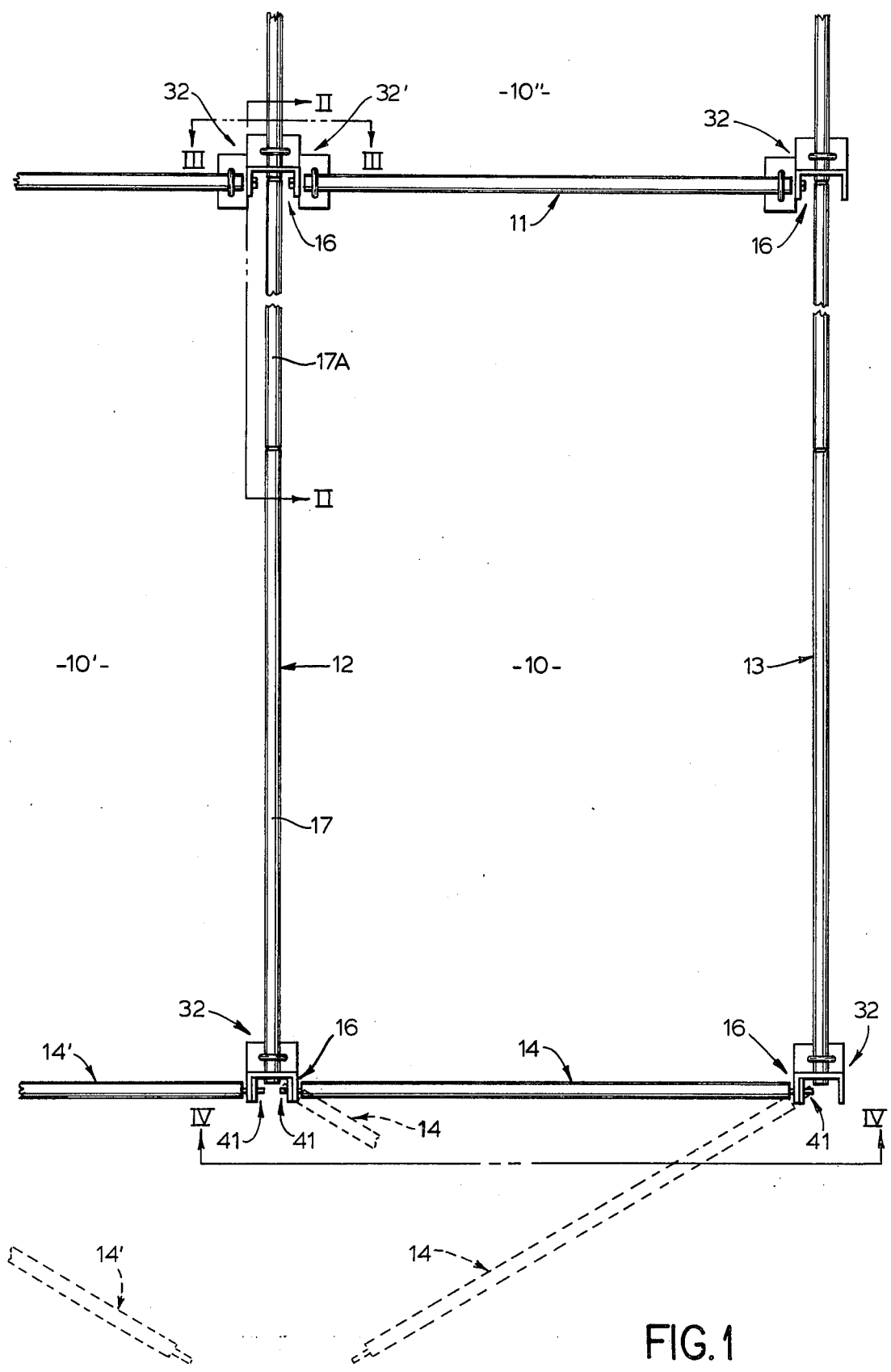
FIG. 1 is a plan view of an animal pen construction according to the present invention.

Certain terminology will be used in the following description for convenience in reference only and will not be limiting. For example, the words "upwardly", "downwardly", "rightwardly" and "leftwardly" will refer to directions in the drawings to which reference is made. The word "front" will be used to refer to that side of the pen in which the gate is positioned, namely the lower part of the pen as shown in FIG. 1, and the word "rear" will refer to the opposite side of the pen, namely the upper side as shown in FIG. 1. The words "inwardly" and "outwardly" will refer to directions toward and away from, respectively, the geometric center of the pen construction and designated parts thereof. Said terminology will include the words specifically mentioned, derivatives thereof, and words of similar import.

DETAILED DESCRIPTION

Referring to FIG. 1, there is illustrated an animal pen construction 10 formed by a back wall 11, opposite sidewalls 12 and 13, and a front wall 14, the latter functioning as a swingable gate. These walls are joined together through a plurality of upright post structures 16 which, in the configuration illustrated in FIG. 1, are located at the corners.

The construction of the pen 10, as briefly described above, is such as to permit a plurality of substantially identical or similar pens to be constructed in side-by-side and/or back-to-back relationship. For example, FIG. 1 illustrates two pens 10 and 10' which are located in side-by-side relationship and have a common sidewall 12 therebetween. Similarly, two pens 10 and 10" can also be located in back-to-back relationship so as to have a common back wall 11 therebetween. The number, size, configuration and positional relationship of the pens is obviously a matter of choice which is determined by the available space within the livestock building and the desired utilization of this space.

In the animal pen construction 10, each of the walls can be formed of desired length by selectively joining together a plurality of modular wall sections which are prefabricated in units of selected length, such as units having lengths of one, two and four feet. The sidewall 12, for example, is illustrated in FIGS. 1 and 2 as being constructed from two modular wall sections 17 and 17A which can be of identical length or of different lengths depending upon the desired overall length of the sidewall.

The modular wall section 17 includes upper and lower tubular rails 18 (FIG. 2) which extend substantially horizontally and are rigidly joined by vertically extending tubular styles 19. The adjacent modular wall sections, such as the sections 17 and 17A, are releasably connected together by means of a male-female telescopic connection 21. This telescopic connection 21 is formed by providing each of the modular wall sections with a reduced diameter tubular projection 22 extending outwardly from one end of each rail 18, which tubular projection 22 has an outer diameter slightly less than the diameter of the central opening 23 defined by the tubular rail 18. Thus, the projection 22 formed at one end of each wall section can thus be slidably and telescopically inserted into the socketlike central opening 23 which is formed at the other end of each wall section. In this manner, any selected number of wall sections 17 can be slidably telescoped together to thereby form a wall of desired length. By making the wall sections 17 of several different lengths, the correct number and length of different wall sections 17 can be joined together so as to produce any desired wall length.

Considering now the post structure 16, same comprises an upright post member 26 (FIGS. 2–6) of channel-shaped configuration. This post member 26 is, in the illustrated embodiment, provided with a platelike foot 27 fixedly secured to the lower end thereof to enable the post structure to be supported on a floor. The channel-shaped post member 26 is defined by opposed parallel side legs 28 which are joined together by a base web 29. This base web has a pair of enlarged openings 31 extending therethrough, which openings are disposed adjacent the upper and lower ends of the post member and are spaced apart by a vertical distance equal to the spacing between the upper and lower rails 18. These openings 31 thus enable the projecting ends of the rails 18 to extend through the web of the post member so that a pair of wall sections 17 can be slidably telescopically connected even though disposed on opposite sides of a post member, substantially as illustrated in the upper portion of FIG. 1. This thus greatly simplifies the assembly of the modular wall sections inasmuch as adjacent wall sections can be directly telescopically connected even though an intermediate post is being provided. At the same time, the telescopic connection between the adjacent wall sections permits the overall length of the wall to be adjusted sufficiently to compensate for both manufacturing and assembly tolerances, without requiring that a precise dimensional limitation be maintained in order to permit proper connection to the post. However, the load of the sidewall can be transferred to the post inasmuch as the tubular rial 18 will bear against the lower edge of the opening 31, substantially as shown in FIG. 5.

To further rigidify the animal pen construction, the sidewalls are preferably rigidly clamped to the post. For this purpose, there is provided a clamping structure 32 which, as illustrated in FIG. 3, includes an L-shaped bracket 33 which has the lower vertical leg 34 thereof fixedly secured to the post, as by being secured to the exterior surface of the web 29 by a pair of bolts 36. The upper horizontal leg 37 of bracket 33 is positioned directly adjacent the bottom of opening 31 so that the tubular rail 18 will thus bear against this horizontal leg 37. A suitable U-shaped clamping member 38 is positioned in straddling relationship over the rail 18 so that the threaded legs of this clamping member project through the upper leg 37 and are fixed in position, as by means of nuts 39. In this manner, the tubular rails of the joined wall sections 17 are thus fixedly related to the respective post member 26. This clamping structure, however, permits the sidewall and particularly the telescopic connection between the adjacent modular wall sections to compensate for tolerances during assembly of the pen construction, since the rails can be easily fixedly clamped in position relative to the posts after the pen construction has been assembled. This clamping structure 32 is usable when the wall extends through the post, as shown in the upper part of FIG. 1, or when the wall extends to only one side of the post, as shown in the lower part of FIG. 1.

The clamping structure 32 is also adaptable for use in securing the pen walls to the side legs 28 of the post 26. This is illustrated in FIG. 3 wherein the rails 18 associated with the walls terminate just short of the legs 28, which rails are fixedly secured to the post by means of a clamping structure 32' which is identical to the structure 32 described above.

Considering now the gate 14, it is also constructed from one or more modular wall sections 17 which are suitably selected and telescopically joined together to form a gate having the desired length. However, when the gate is formed from a plurality of these modular wall sections 17, then a suitable connecting structure such as a bolt is positioned transversely through the telescopic connection 21 to prevent the adjacent wall sections from separating when the gate is in an open position.

To permit opening and closing of the gate 14, a latching structure 41 (FIGS. 1, 5 and 6) coacts between the gate 14 and the adjacent post 26. This latching structure includes a platelike latch element 42 which projects outwardly from the end of the upper and lower tubular rails 18. This latch element 42 has a rear flange 43 which projects into the interior of the tubular rail and is fixed thereto, as by welding. Element 42 has a slot 44 formed upwardly from the lower edge thereof, which slot has a width slightly greater than the thickness of the post leg 28. This slot 44 results in the formation of a nose portion 46 at the free end of the latch element.

The latch element 42 is adapted for cooperation with a substantially rectangular recess 47 which projects inwardly from the free edge of the leg 28, which recess is one of a pair of identical recesses located in each leg at the upper and lower ends thereof. The recess 47 is positioned at an elevation so that the leg is adapted to project into the slot 44, as shown in FIG. 5, when the gate is closed. In this position, the nose 46 projects downwardly to overlap the leg 28, thereby providing structural rigidity between the front posts in the longitudinal direction of the gate. The latch element 42 can be moved away from the post 26 and out of the recess 47 solely by swinging the gate horizontally about one edge so that the leg 28 is thus removed from the slot 44.

To fixedly lock the gate in its closed position, the latching structure 41 includes a movable latch bar 48 which is slidably mounted on the post member 26 directly adjacent the inner surface of the leg 28. This bar 48 is vertically slidably moveable between a latching position shown by solid lines in FIGS. 5 and 6, and a released position shown by dotted lines in FIG. 5. The latching bar 48 is slidably supported on the leg 28 by a pair of vertically spaced bolts 49 which are fixed to the leg 28 and extend through vertically elongated guide slots 51 formed in the latch bar. This latch bar 48 also has a handle 52 fixed thereto and positioned within the interior of the channel-shaped post 26, whereby the handle 52 is accessible to permit manual vertical lifting of the latch bar into the release position.

The latch bar 48 is provided with an L-shaped opening 53 formed in the upper and lower ends thereof, which openings are positioned adjacent the respective upper and lower recesses 47 formed in the leg 28. Each L-shaped opening 53 includes a lower part 54 which is of a rectangular configuration similar to the recess 46, and which opens inwardly from the edge of the latch bar 48. This lower opening part 54 terminates in an upper part 56 which projects upwardly and has a narrow slotlike configuration. This upper part 56 results in the latch bar having a downwardly projecting portion 57. When the latch bar is in its lowered or latching position, as shown by solid lines in FIGS. 5 and 6, the latch element 42 is accommodated within the slotlike opening 56 and is confined therein by the projection 57, whereby the latch element 52 is thus positively locked with respect to the post 26 and cannot be moved out of the recess 47. Further, the positioning of the latch bar 48 within the interior of the channel-shaped post, and the cooperation of this latch bar with the latch element 42, positively prevents accidental opening of the gate due to lifting or jiggling thereof by the confined animals.

The latch structure 41, and particularly the confinement of the latch element 42 by the latch bar 48, also performs a further function in that this structure also acts as a hinge for permitting the gate to be swingably opened through a limited angular extent, such as at least approximately 30°, when the latch bar 48 is in its lowered latching position. Since the slot 44 has a width somewhat greater than the channel leg 28, and inasmuch as the slotlike opening 56 in the latch bar has a width somewhat greater than the thickness of the latch element 42, there is thus sufficient clearance to permit the latch element 42 to function as a pivot with respect to the leg 28 so that the gate 14 can be hingedly swung about this structure. By providing an identical latch structure 41 at opposite ends of the gate 14, substantially as shown in FIG. 1, the gate can thus be opened at either end, whereby the other end functions as a hinge, thereby permitting the gate to be selectively swingably opened about either end depending upon the manner in which the structure is to be utilized.

If a dual opening gate is not desired, then one end of the gate can be suitably hingedly connected to the adjacent post by means of a simplified hinge structure, substantially as illustrated in FIG. 7. In this case, the tubular rails 18 associated with one end of the gate are suitably connected to the adjacent leg 28 of the post 26 by means of a bolt 61 which functions as a hinge pin, which bolt extends through the rail 18 and is connected to the top leg of an L-shaped bracket 62, which bracket in turn is fixedly secured to the leg 28. The bracket 62 can be substantially identical to the L-shaped bracket 33 as described above. In this instance, the latch structure 41 is then provided adjacent only one end of the gate 14.

The assembly of the animal pen construction 10 is believed readily apparent from the structural description set forth above. Due to the manner in which the walls are formed from the modular wall sections 17, the walls of the pen can be assembled to have the desired length merely by slidably telescopically connecting the desired number and size of wall sections 17. Further, an identical post member 26 is utilized at all locations, whether as a corner post, a gate post, or an intermediate post along one wall section. These posts effectively bear the weight of the walls, thereby providing rigidity for the overall pen construction, while at the same time the adjacent wall sections 17 can be slidably telescoped together through the appropriate openings 31 so that dimensional limitations or tolerances with respect to the length of the walls need not be tightly held.

The gate 14 is similarly manufactured of the desired length by again telescopically connecting the desired number and size of wall sections 17. When so assembled, the gate is then provided with appropriate structure fixed to the ends thereof, such as elements 42, which elements function both as latching elements and as hinge elements so that the gate can be swingably moved into an open position about either end, substantially as illustrated in FIG. 1. The universal post member 26, inasmuch as identical openings and recesses are formed in both of the legs 28, thus enables the gate and latch structure to be connected to either of the legs, or to both of the legs if desired, substantially as shown in FIG. 1. With this arrangement, two side-by-side pens can thus have the gates 14 and 14' simultaneously opened so that animals can be readily transferred from one pen into the next to permit cleaning or servicing of the pen. On the other hand, these same gates can be swingably opened about the other end if desired since provision of the latch structure 41 at each end of the gate permits the gate to have a combined hinge-latch structure at either end to permit this dual opening function to be accomplished.

Further, since the latching structure is disposed entirely within the channel-shaped post member, it is totally hidden and can thus not be accidentally released by the animals. Even if the animals can successfully jiggle the gate upwardly so as to lift the latch element 42 upwardly a sufficient extent for the nose 46 to clear the wall of the leg, nevertheless the latch can still not be released since it is confined within the latch bar slot 56 by the projection 57, inasmuch as the latch bar is continuously urged by gravity into its downward latching position.

While the pen construction 10 illustrated in FIG. 1 discloses the use of posts solely at the corners, it will be appreciated that the posts can also be positioned at intermediate locations along the walls of the pen, such as at intermediate locations along the sidewalls 12 and 13 if desired, depending upon the length of the walls. Also, while FIG. 1 illustrates the use of a back wall 11, it will be appreciated that any one of the back or side walls can be removed or eliminated in those instances where the pen borders against the wall of a building, so that in these instances the other walls can be supported either on posts which are mounted directly adjacent the building wall, or in the alternative can be attached directly to the building wall by means of a mounting structure identical to the clamping structure 32.

While FIG. 1 illustrates the front wall 14 as being comprised solely by the gate, that is, the gate extends completely across the width of the pen as measured between the sidewalls 12 and 13, nevertheless it will be appreciated that the swingable gate 14 could comprise only a part of the front wall and thus have a length less than the width of the pen. In this instance, the gate would again be mounted between a pair of identical posts, with the remaining portion of the sidewall being built up from one or more telescopically connected wall sections 17.

Although a particular preferred embodiment of the invention has been disclosed in detail for illustrative purposes, it will be recognized that variations or modification of the disclosed apparatus, including the rearrangement of parts, lie within the scope of the present invention.

The embodiments of the invention in which an exclusive property or privilege is claimed are defined as follows:

1. In an animal pen construction having wall means defining an enclosed confinement space for livestock, said wall means including a plurality of upright walls and post means fixedly associated with said walls for maintaining same in an upright position, and at least one of said walls having horizontally swingable gate means associated therewith for selectively providing access into said confinement space, the improvement comprising:

said post means including first and second identical post members disposed adjacent the opposite vertical edges of said gate means, each said post member comprising an elongated open channel-shaped member;

a first latch-hinge structure coacting between one edge of said gate means and said first post member for permitting horizontal hinging movement of said gate means about said first post member and release of said gate means from said first post member so that it can be horizontally hingedly moved about said second post member;

a second latch-hinge structure coacting between the other edge of said gate means and said second post member for permitting horizontal hinging movement of said gate means about said second post member and release of said gate means from said second post member so that it can be horizontally hingedly moved about said first post member;

each of said first and second latch-hinge structures including a latch element fixedly secured to the respective edge of said gate means for releasably connecting same to the respective post member, each of said latch-hinge structures also including a manually movable latching member movably supported on the respective post member and disposed within the interior of said channel-shaped member, said movable latching member coacting with said latch element for holding the gate means closed or for permitting the structure to function as a hinge when the movable latching member is in a latched position.

2. A pen construction according to claim 1, wherein each said post member comprises a base web having a pair of legs projecting outwardly therefrom in substantially parallel relationship, a pair of identical recesses formed in said legs directly opposite one another and extending inwardly from the free edge of the legs, said latch element being movable into the respective recess when the gate means is closed, said latch element having a vertically projecting portion which is positionable within the post member so as to vertically overlap an adjacent part of the respective leg, and said latching member being disposed within the interior of said post member and positioned adjacent the interior surface of said leg, said latching member being movably supported with respect to the leg for movement between said latched position wherein it overlaps the free edge of said recess for confining the projecting portion of the latch element in the recess and a released position wherein the recess in the leg is opened to permit the latch element to be moved outwardly therefrom.

3. A pen construction according to claim 2, wherein the latching member is slidably supported on said post member for vertical movement between said latched and released positions, said latching member being normally maintained in a lowermost position corresponding to said latched position and being manually movable upwardly into said released position.

4. A pen construction according to claim 3, wherein said latching member has an L-shaped opening therein which partially overlaps the recess in said leg, said L-shaped opening having a lower horizontal portion which projects inwardly from the free edge of the latching member and terminates in an upwardly projecting slotlike portion which confines the latch element therein when the gate means is closed and the latching member is in its lowered latched position.

5. In an animal pen construction having a pair of opposed and substantially parallel upright sidewalls, and a front wall extending transversely between said pair of sidewalls, said front wall including gate means swingable horizontally between open and closed position, and a pair of upright posts connected to the opposite ends of said front wall and connected to the respective sidewalls, the improvement comprising:

each of said sidewalls being formed from a plurality of prefabricated modular wall sections which are slidably telescopically connected together in the longitudinal direction of said sidewall;

each said modular wall section including upper and lower elongated support rails extending horizontally in the longitudinal direction of the sidewall, and a plurality of rigidifying elements extending transversely between and fixedly connected to the upper and lower support rails;

socket means formed in the ends of the upper and lower support rails at one end of said modular wall section, and projection means formed at the other ends of said upper and lower support rails as located at the other end of said modular wall section, said socket means and said projection means extending axially of the support rails and the socket means being sized to slidably telescopically receive therein said projection means so that two adjacent modular wall sections can be slidably telescopically connected together by slidably inserting the projection means on one wall section into the socket means in an adjacent wall section; and said sidewall having an upright post associated therewith for supporting the sidewall, said last-mentioned post being aligned with the sidewall and the latter having a pair of said wall sections positioned on opposite sides of said last-mentioned post, said last-mentioned post having a pair of vertically spaced openings extending horizontally therethrough for permitting said pair of wall sections to be directly slidably telescopically connected due to at least one of said socket means and projection means as formed on the ends of the upper and lower support rails projecting through said openings.

6. A pen construction according to claim 5, including friction-type clamping means mounted on said last-mentioned post for creating a friction-type clamping engagement with the end of the support rails having said socket means formed therein.

7. A pen construction according to claim 5, wherein said gate means is also formed from a plurality of said modular wall sections which are slidably telescopically connected together in the lengthwise direction of said gate means.

8. A pen construction according to claim 5, wherein all of the upright posts associated with said animal pen construction include an identical upright channel-shaped post member.

9. A pen construction according to claim 8, wherein the pair of upright posts which are connected to the opposite ends of the front wall includes a first post hingedly connected to one edge of said gate means and also fixedly connected to one of said sidewalls, and a second post releasably engageable with the other edge of said gate means and fixedly connected to the other of said sidewalls, said second post and the other edge of said gate means having a latching structure cooperating therebetween for fixedly but releasably connecting said gate means to said second post, said latching structure including latching elements associated with the ends of the upper and lower support rails and cooperating with a pair of vertically spaced recesses formed in said second post, and a latching bar vertically slidably supported on said second post within the interior thereof and cooperating with the latching elements and the recesses for holding the gate means in its closed position.

10. A pen construction according to claim 9, wherein said latching structure which cooperates between the other edge of said gate means and said second post also functions as a hinge for permitting said gate means to be swingably moved into an open position about said second post, and wherein an identical latching structure cooperates between said one edge of the gate means and said first post to permit either release of the gate means from said first post or swinging movement of said gate means about said first post, whereby said gate means can be swingably opened about either edge thereof.

11. In an animal pen construction having wall means defining an enclosed confinement space for livestock, said wall means including a plurality of upright walls and post means fixedly associated with said walls for maintaining same in an upright position, at least one of said walls having horizontally swingable gate means associated therewith for selectively providing access into said confinement space, the improvement comprising:

said post means including first and second post members disposed adjacent the opposite vertical edges of said gate means, each said post member comprising a vertically elongated channel-like member;

a first latch-hinge structure coacting between one edge of said gate means and said first post member for permitting horizontal hinging movement of said gate means about said first post member and release of said gate means from said first post member so that it can be horizontally hingedly moved about said second post member;

a second latch-hinge structure coacting between the other edge of said gate means and said second post member for permitting horizontal hinging movement of said gate means about said second post member and release of said gate means from said second post member so that it can be horizontally hingedly moved about said first post member;

each of said first and second latch-hinge structures including a latch element fixedly secured to and projecting outwardly from the respective edge of said gate means for releasably connecting said to the respective post member, each of said latch-hinge structures also including a manually movable latching member movably supported on the respective post member and disposed so as to be accessible solely from the exterior side of said gate means whereby said latching member cannot be moved by the animals enclosed within the confinement space, said latching member being manually movable between latched and unlatched positions, said movable latching member coacting with the respective latch element for holding the gate means closed or for permitting the respective latch-hinge structure to function as a hinge when the other latch-hinge structure is moved into its unlatched position.

12. A pen construction according to claim 11, wherein each said latch-hinge structure includes a recess formed in the respective post member for receiving therein said latch element, said recess being bounded by upper and lower stop surfaces for vertically confining said latch element therebetween, said recess opening outwardly through the front side of the respective post member to permit horizontal swinging movement of the gate means during opening thereof, and said latching member being vertically movable between raised and lowered positions which correspond to said unlatched and latched positions respectively, said latching member including a projecting portion which projects across the open mouth of said recess to confine the latch element therein when the latching member is in said latched position.

13. A pen construction according to claim 11, wherein each said latch-hinge structure includes a pair of said latch elements fixedly secured to and projecting outwardly from the respective edge of said gate means, said latch elements being vertically spaced a substantial distance apart, and said latching member comprising a vertically elongated element which is vertically slidably supported on the respective post member and cooperates with the respective pair of latch elements, said latching member being manually vertically movable between raised and lowered positions which correspond to said unlatched and latched positions respectively.

* * * * *

UNITED STATES PATENT AND TRADEMARK OFFICE
CERTIFICATE OF CORRECTION

PATENT NO. : 4 148 277
DATED : April 10, 1979
INVENTOR(S) : William L. Engle et al It is certified that error appears in the above-identified patent and that said Letters Patent are hereby corrected as shown below:

Column 11, line 7; delete "said" (second occurrence) and insert ---same---.

Signed and Sealed this

Eighteenth Day of September 1979

[SEAL]

Attest:

Attesting Officer

LUTRELLE F. PARKER
Acting Commissioner of Patents and Trademarks